US009807058B2

(12) United States Patent
Jia et al.

(10) Patent No.: US 9,807,058 B2
(45) Date of Patent: Oct. 31, 2017

(54) MONITORING WIRELESS DATA CONSUMPTION

(71) Applicant: T-Mobile USA, Inc., Bellevue, WA (US)

(72) Inventors: Yunhan Jia, Ann Arbor, MI (US); Jong Sung Yoon, Sammamish, WA (US); Jie Hui, Mercer Island, WA (US); Samson Kim-Sun Kwong, Bellevue, WA (US); Kevin Lau, Issaquah, WA (US); Salvador Mendoza, Issaquah, WA (US); Zhuoqing Morley Mao, Ann Arbor, MI (US)

(73) Assignee: T-Mobile USA, Inc., Bellevue, WA (US)

(*) Notice: Subject to any disclaimer, the term of this patent is extended or adjusted under 35 U.S.C. 154(b) by 79 days.

(21) Appl. No.: 14/859,765

(22) Filed: Sep. 21, 2015

(65) Prior Publication Data

US 2017/0005989 A1   Jan. 5, 2017

Related U.S. Application Data

(60) Provisional application No. 62/187,955, filed on Jul. 2, 2015.

(51) Int. Cl.
*H04L 29/06* (2006.01)
*H04L 29/08* (2006.01)
*H04L 12/951* (2013.01)
*H04W 28/02* (2009.01)

(52) U.S. Cl.
CPC ........ *H04L 63/0281* (2013.01); *H04L 63/101* (2013.01); *H04L 63/1433* (2013.01); *H04L 67/28* (2013.01); *H04W 28/0257* (2013.01); *H04W 28/0263* (2013.01); *H04W 28/0268* (2013.01)

(58) Field of Classification Search
None
See application file for complete search history.

(56) References Cited

PUBLICATIONS

Abusing IP Protocols to Create Covert Channels when Penetration Testing. Gianchandani, Prateek. 2011.*
Port Knocking: Beyond the Basics. Isabel, Dawn. SANS Institute(2005).*
Information theft through covert channel by exploiting HTTP Post method. Tomar et al. IEEE(2013).*

* cited by examiner

*Primary Examiner* — Venkat Perungavoor
(74) *Attorney, Agent, or Firm* — Lee & Hayes, PLLC

(57) ABSTRACT

Techniques and devices for circumventing wireless data monitoring in communications between a communication device and a proxy server, as well as systems and techniques for detecting and resolving vulnerabilities in wireless data monitoring systems are described herein. The techniques for circumventing wireless data monitoring may include manipulating a routing table of a communication device, encapsulating data in an unmonitored protocol, and transmitting the encapsulated data in a "bearer," or communications channel, to a proxy server that fulfills requests included in the encapsulated data. Furthermore, the techniques for detecting and resolving network vulnerabilities may include restricting protocols by bearers in an Access Control List, limiting a bandwidth of a bearer, or protecting a routing table in a secure location of the communication device.

17 Claims, 6 Drawing Sheets

MONITORING WIRELESS DATA CONSUMPTION

CROSS REFERENCE TO RELATED APPLICATIONS

This patent application claims priority filing benefit from U.S. Provisional Patent Application No. 62/187,955, filed Jul. 2, 2015, which is hereby incorporated by reference, in its entirety.

BACKGROUND

Communication devices, also called telecommunication devices, have evolved from mobile replacements for the telephone to all-in-one communication, media, and productivity solutions. In addition to voice calling, telecommunication devices now support video and song playback, calendaring, and a variety of other features. Such features include web browsing, video streaming, video chat, and many others. Additionally, communication devices now include a wide variety of device types, including cellular phones, personal computers (PCs), personal digital assistants (PDAs), tablet computers, and media players. A service provider may provide subscription plans that allocate an amount of voice and data, for example, to the communication devices supported on a network. Because the network supporting the communication devices may have a finite capacity, it may be important to track the usage of the voice and data to accurately bill customers, as well as to limit an amount of voice and data used by a particular communication device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
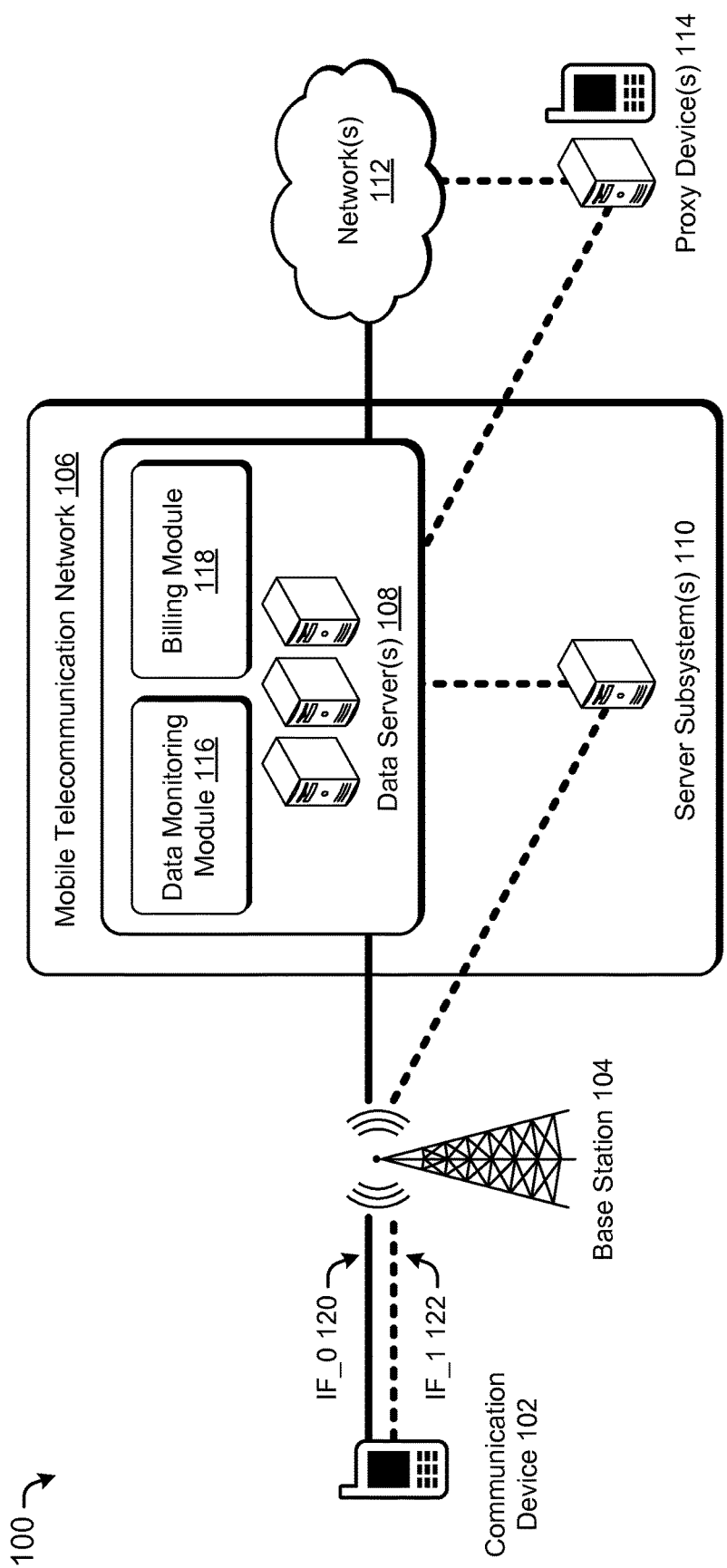
FIG. 1 illustrates an example environment in which voice and data communications may be transmitted and received, in accordance with embodiments of the disclosure.

This disclosure describes, in part, apparatuses, systems, and techniques for circumventing wireless data monitoring in communications between a communication device and a proxy server, as well as apparatuses, systems, and techniques for detecting and resolving vulnerabilities in wireless data monitoring systems. The techniques for circumventing wireless data monitoring may include manipulating a routing table of a communication device, encapsulating data in an unmonitored protocol, and transmitting the encapsulated data in a "bearer," or communications interface or channel, to a proxy server that fulfills requests included in the encapsulated data. Furthermore, the techniques for detecting and resolving network vulnerabilities may include restricting protocols by bearers in an Access Control List, protecting a routing table in a secure location of the communication device. The apparatuses, systems, and techniques herein may also be used to monitor communication devices and networks to identify vulnerabilities, and/or to use as a diagnostic tool for determining a network Quality of Service (QoS).

In various embodiments, a service provider may charge a user of a communication device separately for voice and data communication traffic, with voice calls being charged or accounted for according to call duration (e.g., minutes per call), and with data traffic being charged or accounted for according to volume (e.g., megabytes or gigabytes per month). In some embodiments, voice and data traffic are transmitted to and from a communication device using separate "bearers," or channels with various parameters. For example, data traffic may be transmitted using a "default bearer," while voice traffic may be transmitted using a "dedicated bearer," which may provide a guaranteed QoS when a network is congested with network traffic. Voice and data traffic are transmitted using the various bearers according to a routing table in the communication device. If root level access is obtained for a communication device, the routing table may be manipulated to redirect data traffic from the default bearer to a dedicated bearer. Furthermore, the data traffic may be encapsulated as a communication type that is not normally monitored by the service provider, for example, as Internet Control Message Protocol (ICMP) packets, and routed to a proxy server, which in turn fetches and returns content to the communication device. In this manner, a communication device may circumvent data monitoring of a network.

In response, various embodiments are provided to resolve the network vulnerability described herein. As a first example, a network may be configured with an Access Control List, which may be used to prevent certain types of communications or protocols from being directed outside of the service provider's network. For example, ICMP packets may be restricted or prevented from being addressed to any components outside of a service provider's network. As a second example, a bandwidth of a bearer, such as the "dedicated bearer," may be limited or throttled for an individual communication device. For example, if a dedicated bearer is used as a voice channel dedicated to Voice over Long Term Evolution (VoLTE), a bandwidth of the channel may be limited to 200 Kbps (kilobits per second) (or any other value less than a maximum bandwidth of the channel), which may provide enough bandwidth for a voice call. As a third example, a routing table in a communication device may be provided in a trusted execution environment of the communication device, wherein an operating system of the device is protected by a secure boot verification mechanism. In this manner, the routing table may be protected from any manipulation or tampering to redirect packets to a proxy server, in accordance with embodiments of the disclosure. Furthermore, it may be understood in the context of this disclosure that these examples are non-limiting and/or that they may be used together in any combination.

In various embodiments, the techniques described herein may improve a functioning of a network by reducing an amount of traffic transmitted and received in the network. For example, if voice and data communications are properly monitored and accounted for, a user of a communication device may be more judicious about his or her use of voice or data, which in turn, reduces overall congestion in the network. Furthermore, using the techniques and systems described herein may improve a functioning of a network by preventing unauthorized communication traffic, which may reduce an overall congestion of the network. Decreasing congestion in a network further reduces an amount of processing required by components of the network. A functioning of the network may be further improved using the techniques and systems described herein as a diagnostic tool to synchronize bearer channels and/or by increasing a QoS of the network.

FIG. 1 illustrates an example environment 100 in which voice and data communications may be transmitted and received in accordance with embodiments of the disclosure. To this end, the environment 100 may include a communication device 102, a base station 104, a mobile telecommunication network (MTN) 106 that includes data server(s) 108 and server subsystem(s) 110, network(s) 112, and proxy device(s) 114. Moreover, the data server(s) 108 may further include at least a data monitoring module 116 and a billing module 118. In various embodiments, the communication device 102 may transmit and receive data traffic over an interface or channel such as IF_0 120 (i.e., a default bearer) and voice traffic over an interface or channel such as IF_1 122 (i.e., a dedicated bearer).

Figure 2:
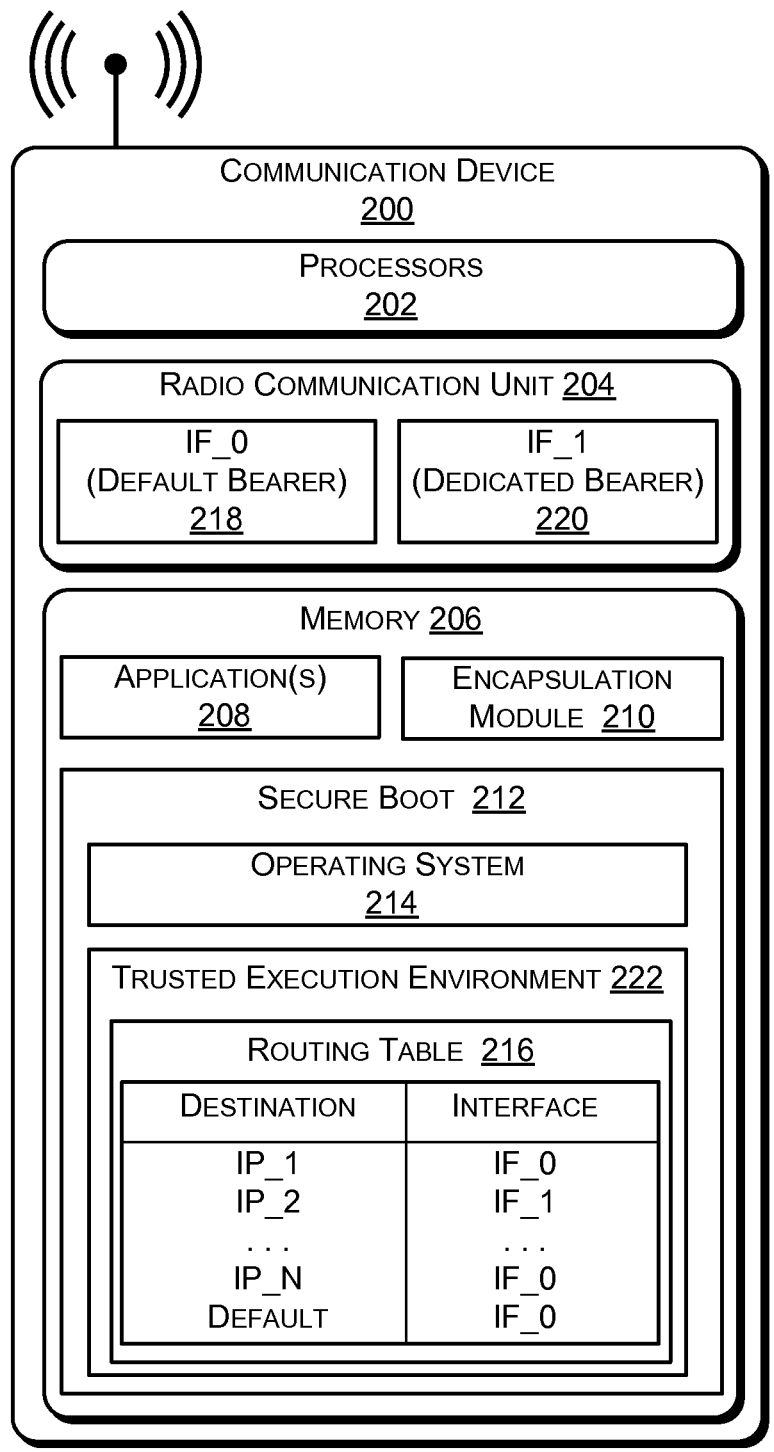
FIG. 2 illustrates example components of a communication device configured to initiate data communications in various channels, in accordance with embodiments of the disclosure.

In various embodiments, the communication device 102 may include, but is not limited to, one or more smart phones, mobile phones, cell phones, tablet computers, portable computers, laptop computers, personal digital assistants (PDAs), electronic book devices, handheld gaming units, personal media player devices, wearable devices, or any other portable electronic devices that may generate voice and/or digital data, request voice and/or digital data over the MTN 106, receive voice and/or digital data over the MTN 106, and/or exchange voice and/or digital data over the MTN 106. An example communication device 102 is illustrated in FIG. 2 and described below with reference to that figure.

In some embodiments, the base station 104 may include a cellular base station transceiver (such as a NodeB or an Enhanced-NodeB) configured to provide wireless communication via a VoLTE (Voice over Long Term Evolution) protocol. As illustrated in FIG. 1, the base station 104 may facilitate communications between the communication device 102 and the MTN 106. In some embodiments, the base station 104 may be included in the MTN 106.

The mobile telecommunication network (MTN) 106 may be configured to implement one or more of second, third, and fourth generation (2G, 3G, and 4G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Thus, the MTN 106 may implement GSM, UMTS, and/or LTE/LTE Advanced telecommunications technologies. The MTN 106 may include, but is not limited to, a combination of: base transceiver stations BTSs (e.g., NodeBs, Enhanced-NodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the communication device 102 and the network(s) 112 and/or the proxy device(s) 114. In some embodiments, the MTN 106 is operated by a service provider. While FIG. 1 illustrates a MTN 106, it is understood in the context of this document, that the techniques discussed herein may also be implemented in other networking technologies, such as nodes that are part of a wide area network (WAN), metropolitan area network (MAN), local area network (LAN), neighborhood area network (NAN), personal area network (PAN), or the like.

Figure 4:
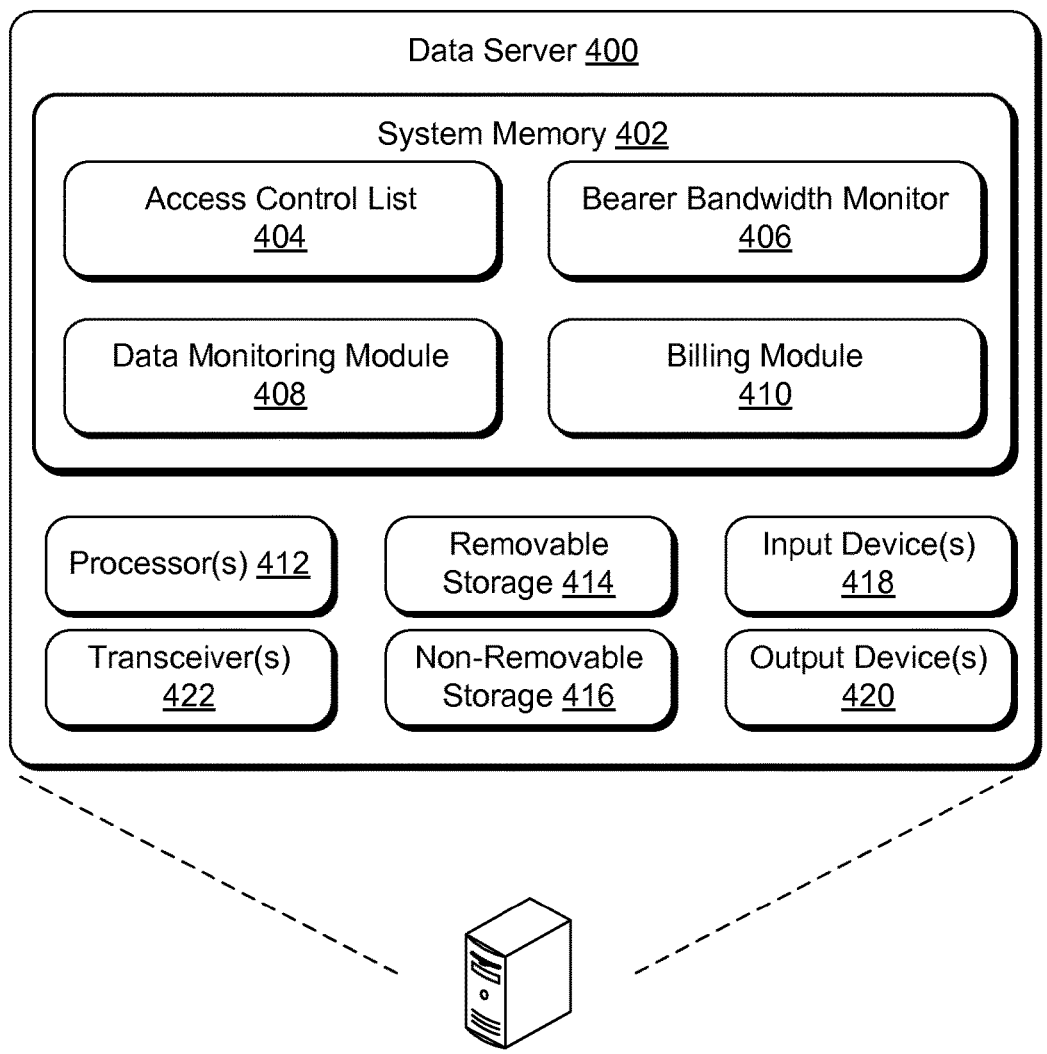
FIG. 4 illustrates example components of a device configured to monitor wireless data consumption, in accordance with embodiments of the disclosure.

In various embodiments, the data server(s) 108 may include one or more 4G network devices to provide connectivity of the communication device 102 to the network. Further, the data server(s) 108 may include the data monitoring module 116 and/or the billing module 118. An example data server(s) 108 is illustrated in FIG. 4 and described below with reference to that figure.

In various embodiments, the data monitoring module 116 may monitor the voice and data traffic for each communication device 102 in communication with the MTN 106. For example, the data monitoring module 116 may monitor a call duration of the communication device 102 and may monitor a data volume of traffic to and/or from the communication device 102, including data content provided by the network(s) 112. In some embodiments, the data monitoring module 116 may ignore or may not log certain traffic, such as ICMP packets directed to or from the communication device 102. The data monitoring module 116 may monitor the traffic for each bearer associated with the communication device 102, and may provide limits to an overall amount of traffic to the communication device 102. For example, the data monitoring module 116 may provide a monthly threshold for data volume associated with the communication device 102. When the threshold for the data volume is exceeded, the data monitoring module 116 may direct the data server(s) 108 to reduce a maximum bandwidth allocated to the communication device 102, or may lower a quality level and/or a priority level provided to voice and/or data communications of the communication device 102.

In various embodiments, the billing module 118 may receive the amount of data and/or voice duration monitored by the data monitoring module 116, and may generate and/or provide a bill to a user of the communication device 102. The billing module 118 may determine a bill based on a subscription plan including voice duration and/or data volume thresholds associated with the communication device 102. As will be understood in the context of the disclosure, the billing module 118 may only bill customers for the data monitored by the data monitoring module 116. That is to say, if the data monitoring module 116 ignores or does not log certain types of data or protocols, the billing module 118 may not accordingly bill a communication device 102.

In various embodiments, the server subsystem(s) 110 may include an Internet Protocol (IP) Multimedia Subsystem (IMS). As illustrated in FIG. 1, the server subsystem(s) 110 may receive the communications from the interface IF_1 122 from the communication device 102, while the data server(s) 108 may receive the communications from the interface IF_0 120 from the communication device 102. It may be understood in the context of this disclosure, however, that the functions of the server subsystem(s) 110 and the data server(s) 108 may be combined and/or allocated in any matter. In some embodiments, the server subsystem(s) 110 and the data server(s) 108 may be illustrated as separate components to illustrate the different paths taken by data transmitted and/or received via the various interfaces IF_0 120 and IF_1 122.

In various embodiments, the network(s) 112 may represent any sort of network or networks, such as a cellular network (circuit-based, packet-based, or both), a WiFi network, a wide access network (WAN), a local area network (LAN), or the Internet. Further, the network 108 may include private network(s), public network(s), or both.

In various embodiments, the proxy device(s) 114 may include a data server similar to the data server(s) 108 and/or may include any device capable of receiving communications from the communication device 102 and, in response, fetching, receiving, or transmitting content to and from the network(s) 112. For example, the proxy device(s) 114 may include a separate communication device, such as the communication device 102. In such a case, the proxy device(s) 114 may communicate directly with the communication device 102 with or without accessing content via the network(s) 112.

In various embodiments, the IF_0 120 and the IF_1 122 may include various interfaces or communication channels for the communication device to transmit and/or receive communications from the MTN 106. Although two interfaces are illustrated in FIG. 1 (e.g., interface IF_0 120 and IF_1 122), it may be understood in the context of this disclosure that the communication device 102 and/or the MTN 106 may use any number of interfaces (bearers) as desired.

In some embodiments, the interfaces IF_0 120 and IF_1 122 may be associated with various parameters to ensure a particular Quality of Service (QoS), or may be associated with a particular QoS Class Identifier (QCI). For example, there may be nine discrete QCI levels (e.g., 1-9) individually associated with the interfaces IF_0 120 and IF_1 122. A QCI of 1 may be associated with a highest QoS, which may include a guaranteed bandwidth, latency, delay, or a highest priority level for any communication associated with this QCI. Conversely, a QCI of 9 may reflect a lowest QoS. A QCI level associated with an interface (bearer) may be set at any time, and is typically set by an administrator. By way of example, when a network is not congested, all traffic may be treated equally, meaning, all traffic may receive a highest QoS. As the network becomes more congested, the traffic associated with a bearer having a lower QCI is prioritized over bearer traffic having a higher QCI. In some embodiments, the interfaces (bearers) may represent distinct channels or frequencies in a transmission spectrum, while in some embodiments, the bearers may represent a virtual distinction or identifier for the voice or data traffic discussed herein.

FIG. 2 illustrates example components of a communication device 200 configured to initiate data communications in various channels (or interfaces or bearers), in accordance with embodiments of the disclosure. For example, the communication device 200, which may correspond to the communication device 102 of FIG. 1, is configured to wirelessly transmit and receive voice and/or data traffic to and from the MTN 106 via the base station 104. Thus, the communication device 200 may include one or more processor(s) 202, a radio communication unit 204 for wirelessly communicating with the MTN 106, and a memory 206 storing application(s) 208, an encapsulation module 210, a secure boot 212 including a device operating system (OS) 214 and a Trusted Execution Environment (TEE) 222, the TEE 222 including a routing table 216, configured to request and/or receive voice and data traffic over the MTN 106. Furthermore, the radio communication unit 204 may transmit and receive voice and data communications via one or more of the interfaces IF_0 (default bearer) 218 and IF_1 (dedicated bearer) 220. As may be understood in the context of this disclosure, the radio communication unit 204 may include any number of bearers in addition to the interfaces 218 and 220.

In various embodiments, the application(s) 208 stored at the communication device 200 may include, but are not limited, a voice calling application, a web browser application, a video streaming application, an online gaming application, a calendaring application, a book application, and so on. During execution on the communication device 200, each of the application(s) 208, the encapsulation module 210, the OS 214, the secure boot 212, and/or the TEE 222 may be configured to cause the communication device 200 to initiate voice and/or data communications with the MTN 106, the proxy device(s) 114, and/or the network(s) 112.

The communication device 200 may be configured to communicate over a telecommunications network using any common wireless and/or wired network access technology. Moreover, the communication device 200 may be configured to run any compatible device OS, including but not limited to, Microsoft Windows Mobile®, Google Android®, Apple iOS®, Linux Mobile®, as well as any other common mobile device OS.

Each of the one or more processor(s) 202 can include one or more central processing units (CPUs) having multiple arithmetic logic units (ALUs) that perform arithmetic and logical operations, as well as one or more control units (CUs) that extract instructions and stored content from processor cache-level memory, and then executes instructions by calling on the ALUs during program execution. In an implementation, the processor(s) 202 may be configured to execute each of the software application(s) 208, the encapsulation module 210, the OS 214, the secure boot 212, and/or the TEE 222 stored in the memory 206.

The memory 206 may be implemented using computer readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism.

In some embodiments, the Trusted Execution Environment 222 includes a portion of the memory 206 that provides secure storage and operation of various applications and data, such as the routing table 216. In some embodiments, the secure boot 212 may include a public key in the boot partition which may be verified using a key stored in the hardware of the communication device 200. The secure boot 212 protects the OS 214 and the TEE 222 from being tampered with (i.e., a hacker could replace the OS 214 with a custom OS in order not to use the TEE 222 for the routing table 216). That is to say, the secure boot 212 prevents the OS 214, TEE 222, and/or the routing table 216 from being edited or replaced to manipulate the data monitoring in accordance with embodiments of the disclosure. Data stored in the TEE 222 may be verified and confirmed to be protected and unchanged.

In some embodiments, the routing table 216 may include various destinations and corresponding interfaces associated with the destinations. For example, the routing table 216 lists destinations IP_1, IP_2, . . . , IP_N. These destinations may refer to various Internet Protocol addresses for components in the MTN 106 (including the data server(s) 108 and the server subsystem(s) 110), destinations in the network(s) 112, and destinations at the proxy device(s) 114. When an application or component of the communication device 200 sends a voice or data communication to a destination specifically listed in the routing table (e.g., IP_1, IP_2, . . . , IP_N) the radio communication unit 204 selects a bearer 218 or 220 based on the listing in the routing table 216. When a destination is not listed in the routing table 216, for example, the destination may be associated with the "default" destination, which in FIG. 1 is associated with the default bearer IF_0 218.

As one example of normal voice traffic operation, the communication device 200 may place a voice call to another communication device. In an example where the destination IP_2 in the routing table 216 corresponds to the server subsystem(s) 110 responsible for voice calls, a voice call application of the application(s) 208 may form voice traffic packets and may send those packets over the dedicated bearer 220 to the server subsystem(s) 110, to be ultimately routed to the other party to the voice call. As discussed above, the dedicated bearer 220 may be associated with a QCI of 1, meaning the voice call traffic may be given highest priority of traffic to ensure the best real time communications. Further, the voice traffic on the dedicated bearer 220 may be monitored by the data monitoring module 116 and the voice traffic may be tracked on the basis of the call duration.

As one example of normal data traffic operation, a browser application of the application(s) 208 may send a request to a website to download a file. In an example where the website is listed in the routing table as IP_1 (or in an example where the browser application is permitted to operate only through the data server(s) 108 associated with IP_1), the communication device 200 may form data packets and may send those packets over the default bearer 218 to the data server(s) 108, to be routed by the MTN 106 to the website located in the network(s) 112, for example. As discussed above, the default bearer 218 may be associated with a QCI of 9, meaning the data traffic may be given a low priority of traffic to allow for other traffic, such as voice call traffic, to receive priority. Further, the data traffic on the default bearer 218 may be monitored by the data monitoring module 116 and may be tracked on the basis of the volume of data requested, sent, and/or received.

As illustrated in FIG. 2, the routing table 216 is located in the TEE 222 portion of the memory 206. As may be understood in the context of this disclosure, when the routing table 216 is provided in the TEE 222 portion of the memory 206, the routing table 216 may not be manipulated or tampered with. In some embodiments, however, the routing table 216 may be located within the OS 214 (or another unsecured location) stored in the memory 206. In such an embodiment, the routing table 216 is unsecure and subject to manipulation or tampering, in accordance with embodiments of the disclosure.

In an embodiment where the routing table 216 is not protected in the TEE 222, the routing table 216 may be manipulated to add an address of a proxy device such as proxy device(s) 114 of FIG. 1. Furthermore, the routing table 216 may be manipulated such that traffic directed to the proxy device(s) 114 may be transmitted and received using the dedicated bearer 220. Further manipulations may include rerouting traffic in the routing table to use the dedicated bearer 220, or changing the "default" destination to use the dedicated bearer 220. As a non-limiting example, the routing table 216 may be manipulated to direct all traffic associated with a web browser of the applications(s) 208 to direct traffic to the proxy device(s) 114 using the dedicated bearer 220. In this manner, traffic may be optimized for the particular communication device 200, rather than optimizing traffic for the MTN 106 as a whole.

Further, the encapsulation module 210 may be included in the memory 206 to manipulate the data traffic in conjunction with the routing table 216 manipulation discussed above. To this end, the encapsulation module 210 may encapsulate traffic from a web browser of the application(s) 208, to convert data traffic into a traffic type or protocol that is not monitored or logged by the data monitoring module 116. For example, a hypertext transfer protocol (HTTP) request for web content from a browser of the application(s) 208 may be encapsulated as an Internet Control Message Protocol (ICMP) packet and may be transmitted to the proxy device(s) 114 using the manipulated routing table 216, as described above. The proxy device(s) 114 may receive the encapsulated packet, and in response, may fetch the web content subject to the HTTP request, and may deliver the content to the communication device 200. Accordingly, the proxy device(s) 114 may include a corresponding encapsulation module such as the encapsulation module 210. By encapsulating the data traffic using the encapsulation module 210, the data monitoring module 116 may not properly monitor, log, or track the traffic, and therefore, a customer associated with the communication device 102 may not be properly charged or billed by the billing module 118. An example packet encoded by the encapsulation module is illustrated in FIG. 3 and described below with reference to that figure.

In various embodiments, the default bearer IF_0 218 may correspond to the interface IF_0 120 of FIG. 1, while the dedicated bearer IF_1 220 may correspond to the interface IF_1 122 of FIG. 1. In some embodiments, the dedicated bearer may be reserved for, in the absence of the routing table 216 manipulation, voice communications in the VoLTE network.

Figure 3:
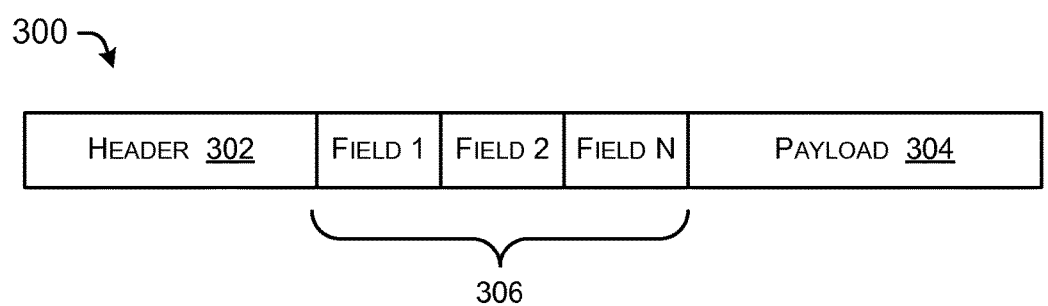
FIG. 3 illustrates an example data packet in which encapsulated data may be transmitted, in accordance with embodiments of the disclosure.

FIG. 3 illustrates an example data packet 300 in which encapsulated data may be transmitted, in accordance with embodiments of the disclosure. The data packet 300 may be generated by the encapsulation module 210 of FIG. 2, as discussed above. The data packet 300 may be configured in association with one or more communication or data exchange/formatting protocols such as TCP, IP, HTTP or other protocols directed to communicating or exchanging content over the MTN 106. In some embodiments, the data packet 300 may be configured as an Internet Control Message Protocol (ICMP) packet.

In various embodiments, the data packet 300 may include a header portion 302 and a payload portion 304. The data packet may further include a portion 306 including N fields, in accordance with the various protocols. In various embodiments, the fields 306 may be part of the header portion 302, the payload portion 304, or a combination thereof.

In various embodiments, one or more of the N fields 306 may be associated with routing and addressing information commonly included in the data packet, or one of more fields that may be defined and are unique to a particular protocol. For example, a field may include a Packet Data Protocol (PDP) address, a source port number, a destination port number, a checksum number (for IPv4 or IPv6), a sequence number, an acknowledgement number, an Internet Protocol (IP) address, an ICMP header, a control message, an error message, a source address, a destination address or any other field in the data packet that may help distinguish one data packet from another. In some embodiments, the header portion 302 and/or the fields 306 may identify the communication device 102 and/or the proxy device(s) 114.

In some embodiments, the payload portion 304 may include data to be sent to the proxy device(s) 114 using the manipulated routing table 216, as discussed above. In some embodiments, the payload portion 304 may include data to be returned to the communication device 102. For example, the payload portion 304 may include one or more HTTP requests from an application for the proxy device(s) 114 to decode and fetch web content on the basis of that HTTP request. As discussed above, in some embodiments, the data monitoring module 116 may not monitor, log, or trace the encapsulated data packets 300. That is to say, an HTTP request encapsulated as an ICMP packet may not be accounted as data traffic against a user's data volume for a subscription plan. As ICMP is often used to send control messages, error messages, or a "ping" function, the data monitoring module 116 may ignore these encapsulated data packets 300. In some embodiments, the encapsulated packets 300 may transmit up to 7 Mbps of data traffic unaccounted for by the data monitoring module 116.

FIG. 4 illustrates example components of a device 400 configured to monitor wireless data consumption, in accordance with embodiments of the disclosure. While the data server 400 is represented as a single device of the data server(s) 108, it is to be understood that the data server 400 may be a plurality of devices with modules and data distributed among them. For example, the data server(s) 108 and the server subsystem(s) 110 could be implemented on different devices or a same device 400 of the MTN 106.

As illustrated, the data server 400 comprises a system memory 402 storing an Access Control List 404, a bearer bandwidth monitor 406, a data monitoring module 408, and a billing module 410. Also, the data server 400 includes processor(s) 412, a removable storage 414 and non-removable storage 416, input device(s) 418, output device(s) 420, and transceiver(s) 422.

In various embodiments, system memory 402 is volatile (such as RAM), non-volatile (such as ROM, flash memory, etc.) or some combination of the two. The Access Control List 404, the bearer bandwidth monitor 406, the data monitoring module 408, and the billing module 410 stored in the system memory 402 may comprise methods, threads, processes, applications or any other sort of executable instructions. The Access Control List 404, the bearer bandwidth monitor 406, the data monitoring module 408, and the billing module 410 may also include files and databases. Further descriptions of the data monitoring module 408 and the billing module 410 are provided above in connection with the discussion of the data monitoring module 116 and the billing module 118 of FIG. 1.

The Access Control List (ACL) 404 may be utilized by the data server 400 to resolve the network vulnerabilities discussed herein. In some embodiments, the ACL 404 may be used to prevent certain types of communication or protocols from being directed outside of the MTN 106, for example. By way of example, ICMP packets may be restricted or prevented from being addressed to any components outside of a service provider's network. That is to say, if the communication device 200 encodes an HTTP request as an encapsulated data packet 300 addressed to the proxy device(s) 114, the encapsulated packet 300 may travel through MTN 106 (and data server 400) before reaching the proxy device(s) 114. With the ACL 404 implemented in the data server 400, the ACL 404 may detect that the encapsulated packet 300 is addressed to the proxy device(s) 114 outside of MTN 106, and may prevent the data packet 300 from further transmission. For example, the ACL 404 may send the encapsulated packet 300 to a holding queue for further analysis, or may delete the packet 300, or otherwise prevent the packet 300 from retransmission.

The bearer bandwidth module 406 may be utilized by the data server 400 to restrict a bandwidth of one or more bearers for sending and receiving voice and/or data traffic from the communication device 200. For example, a bandwidth of a bearer, such as the "dedicated bearer" IF_1 122 of FIG. 1 or IF_1 220 of FIG. 2 may be limited, throttled, capped, restricted, and/or reduced for an individual communication device or on a network-wide basis. In some embodiments, if a dedicated bearer is used as a voice channel dedicated to VoLTE, a high-quality conversation may require around 100 Kbps (kilobits per second) for a voice call. Therefore, the bandwidth of the bearer may be limited to 200 Kbps by the bearer bandwidth monitor 406 to allow for the voice call traffic, as well as any legitimate control messages or error messages, such as ICMP request and reply packets.

In some embodiments, the processor(s) 412 is a central processing unit (CPU), a graphics processing unit (GPU), or both CPU and GPU, or other processing unit or component known in the art.

The data server 400 also includes additional data storage devices (removable and/or non-removable) such as, for example, magnetic disks, optical disks, or tape. Such additional storage is illustrated in FIG. 4 by removable storage 414 and non-removable storage 416. Tangible computer-readable media may include volatile and nonvolatile, removable and non-removable media implemented in any method or technology for storage of information, such as computer readable instructions, data structures, program modules, or other data. System memory 402, removable storage 414 and non-removable storage 416 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the data server 400. Any such tangible computer-readable media may be part of the data server 400.

The data server 400 also has input device(s) 418, such as a keypad, a cursor control, a touch-sensitive display, voice input device, etc., and output device(s) 420 such as a display, speakers, etc. These devices are well known in the art and need not be discussed at length here.

As illustrated in FIG. 4, the data server 400 also includes one or more wired or wireless transceiver(s) 422. For example, the transceiver(s) 422 may include a network interface card (NIC), a network adapter, a LAN adapter, or a physical, virtual, or logical address to connect to the communication device 102, the base station 104, the network(s) 112, the proxy device(s) 114, and/or any component comprising or connected to the MTN 106, for example. To increase throughput when exchanging wireless data, the transceiver(s) 422 may utilize multiple-input/multiple-output (MIMO) technology. The transceiver(s) 422 may be any sort of wireless transceivers capable of engaging in wireless, radio frequency (RF) communication. The transceiver(s) 422 may also include other wireless modems, such as a modem for engaging in WiFi, WiMax, Bluetooth, or infrared communication.

Figure 5:
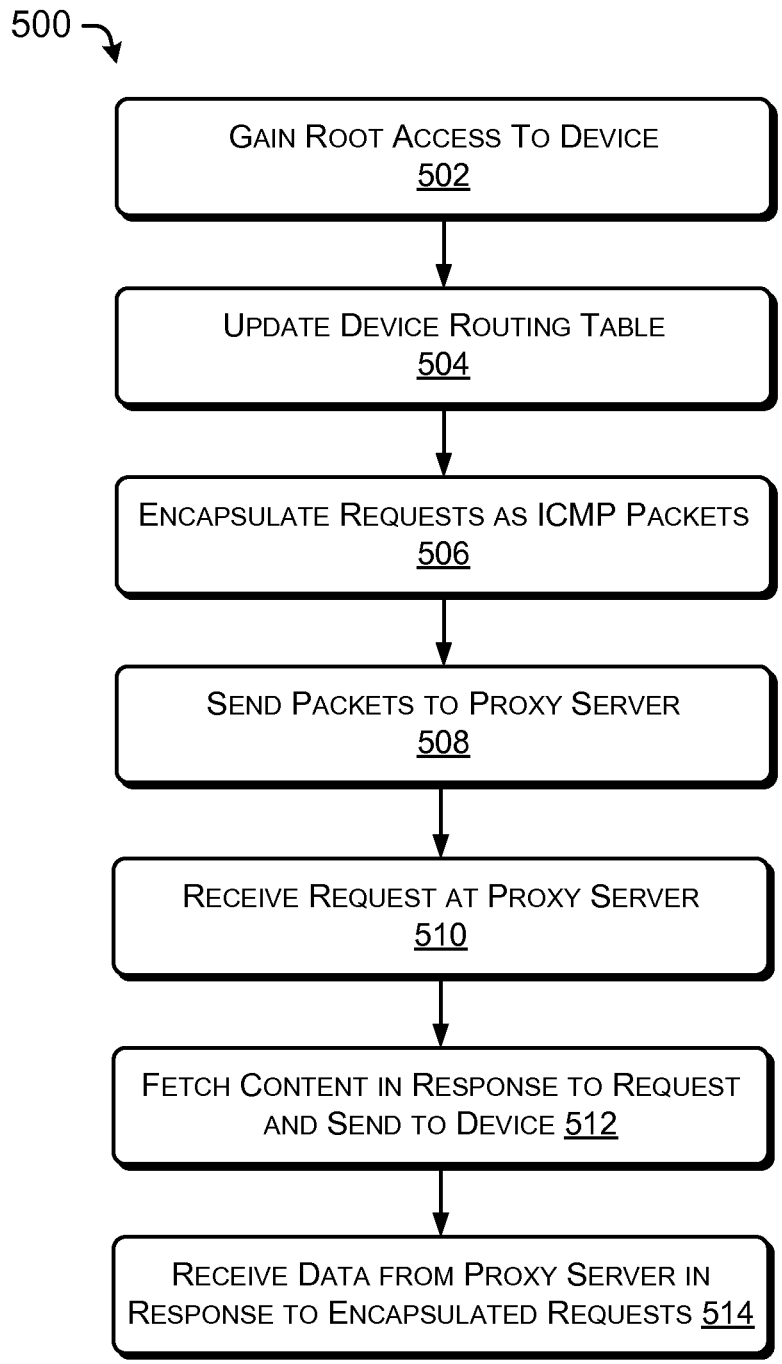
FIG. 5 illustrates an example process for conducting communications between a communication device and a proxy server, in accordance with embodiments of the disclosure.
Figure 6:
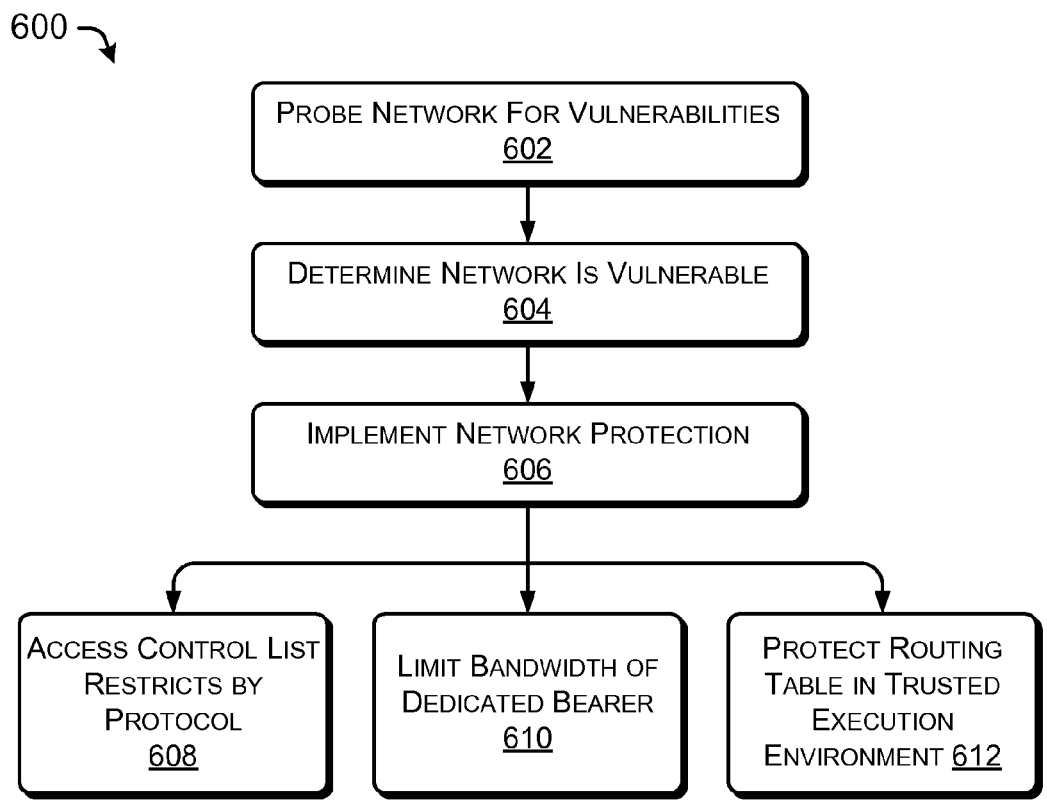
FIG. 6 illustrates an example process for detecting and resolving network vulnerabilities, in accordance with embodiments of the disclosure.

FIGS. 5-6 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates an example process 500 for conducting communications between a communication device (such as the communication devices 102 and 200, respectively) and a proxy device (such as proxy device(s) 114), in accordance with embodiments of the disclosure. In some embodiments, operations 502, 504, 506, 508, and 514 of process 500 may be performed by the communication device 102 or 200, while in some embodiments, operations 510 and 512 of process 500 may be performed by the proxy device(s) 114. In some embodiments, operations of process 500 may be performed by other devices, in a different order, in parallel, and/or may be omitted and/or performed in any combination.

At 502, the operations may gain root access to a device, such as the communication device 200 of FIG. 2. By gaining "root access," a program or user may have complete administrator privileges associated with the communication device 200, through which that user or program may control all software the communication device 200 subject to control by the operating system 214, for example.

At 504, the operations may include updating the device routing table, such as the routing table 216 of the communication device 200. This operation may include determining that the routing table 216 is in an unsecured location, such as the memory 206, and not stored or operating a secure location, such as the Trusted Execution Environment 222. Operation 504 for updating the device routing table may include adding one or more destinations (such as an destination unauthorized by a service provider), changing an interface (bearer) associated with one or more destinations, and/or changing an interface (bearer) associated with the default bearer (i.e., the bearer associated with destinations not expressly listed in the routing table). Operation 504 may also include updating application(s) 208 in the memory 206 of the communication device 200 to redirect, reroute, or remap to a specific destination, or to use a specific bearer, in the routing table 216, for example.

At 506, the operations may include encapsulating requests as Internet Control Message (ICMP) packets. More generally, operation 506 may include encapsulating any voice or data packets in the communication device 200 as any other packet or protocol. In one non-limiting example, HTTP requests from a browser application of the application(s) 208 may be encapsulated as ICMP packets, such as the data packet 300, by the encapsulation module 210. Any packet type may be an input for operation 506, while any packet type may be an output for operation 506, with emphasis on output formats that the data monitoring module 116 ignores when determining voice call duration or data volume of a voice or data communication.

At 508, the operation sends packets to a proxy server, such as the proxy device(s) 114. In some embodiments, the communication device 200 may send the encapsulated packets 300 to the proxy device(s) 114, which may include a proxy server, or may include another communication device in a peer-to-peer configuration. Operation 508 may be performed based on the destination and/or the interface as updated in the routing table in operation 504. As may be understood in the context of this disclosure, operation 508 may including routing packets through the base station 104, the MTN 106, and/or the network(s) 112 to arrive at the proxy device(s) 114.

At 510, the packets sent in operation 508 are received at a proxy server. In some embodiments, this operation may include receiving the encapsulated packets 300 from the communication device 200, for example, and stripping out the HTTP request, for example, from the ICMP packet.

At 512, the proxy server fetches content in response to the request (i.e., in response to the packets received at 510), and sends the fetched content to the communication device 200. In an example discussed above, if the communication device 200 sends an encapsulated packet 300 including an HTTP request to download a file from the network(s) 112 (i.e., the Internet), the proxy device(s) 114 may fetch the web content specified in the request, encapsulate the web content as an ICMP reply packet, and send the web content to the communication device 200. In some embodiments, the proxy device(s) 114 may not encapsulate the data to be sent (returned) to the communication device 200.

At 514, the operation receives the data from the proxy server in response to the encapsulated requests encapsulated in operation 506 and sent in operation 508. As may be understood in the context of this disclosure, by manipulating the routing table 216 on the communication device 200, encapsulating data such as HTTP requests, sending the encapsulated data packets 300 as ICMP packets to a proxy device(s) 114 and receiving requested web content as ICMP reply packets from the proxy device(s) 114, the process 500 may evade detection by the data monitoring module 116. In turn, the data exchange described in process 500 may not be account for or charged to a user or customer by the billing module 118.

In various embodiments, the process 500 may be performed by an application of the application(s) 208, and may include a user interface to assist a user sending and receiving data to and from the MTN 106. Although some aspects of the process 500 have been described in the context of providing voice and data communications to bypass detection and monitoring by the data monitoring module 116 and the billing module 118, the process 500 may be used in other embodiments, such as in a diagnostic tool for a service provider of the MTN 106. For example, as discussed in connection with FIG. 6 below, the operations 500 may be used for detecting, resolving, and verifying network vulnerabilities. Further, an application performing some or all of process 500 may detect a network QoS, for example, by sending various packets to a destination using a variety of interfaces, or a variety of QCIs associated the interfaces. Further, the operations may be used to individually send and detect packets using a plurality of bearers, such as the default bearer and the dedicated bearer, for example, to detect a race condition between the bearers. For example, in the case where a ring tone and voice traffic are received at a destination at a same time, the process 500 may be used to probe the MTN 106 to recreate and pinpoint the root cause of the race condition (e.g., by sending packets on a first bearer using a QCI=5 for signaling data and by sending packets on a second bearer using a QCI=1 for voice traffic). In another example, the operations may be used to measure the bandwidth of the various interfaces, bearers, and/or channels.

FIG. 6 illustrates an example process 600 for detecting and resolving network vulnerabilities, in accordance with embodiments of the disclosure. In some embodiments, individual operations of the process 600 may be performed by the communication device 102 or 200, while in some embodiments, operations of process 600 may be performed by the proxy device(s) 114, the data server(s) 108, the server subsystem(s) 110, or any component of the MTN 106. In some embodiments, operations of process 600 may be performed by other devices, in a different order, in parallel, and/or may be omitted and/or performed in any combination.

At 602, the network may be probed for vulnerabilities. In some embodiments, the network may correspond to the MTN 106, and an application performing the operations of the process 500, described above, may be performed to detect if the undetected data transfer is possible.

At 604, if the undetected data transfer is possible in accordance with embodiments of the disclosure, the operation 604 determines that the network is vulnerable to the covert data transfer discussed herein. In some embodiments, the operation 604 may include providing an indication to a service provider, a data server, and/or a communication device that the network is vulnerable.

At 606, the operation may include implementing one or more types of network protection discussed herein, and discussed below in connection with operations 608, 610, and 612. In some embodiments, the network protections may be used together in any combination to provide redundant levels of protection, as a type of belt-and-suspenders implementation.

At 608, an Access Control List (ACL) may be implemented to restrict voice and data traffic by protocol. In some embodiments, an ACL implemented in operation 608 may correspond to the ACL 404 in FIG. 4. In this manner, the MTN 106 may block certain protocols by destination, bearer, or location inside or outside of the MTN 106. For example, the ACL 404 may prevent ICMP packets from being addressed to a destination outside of the MTN 106, such as the proxy device(s) 114. Furthermore, data packets may be restricted by length of packet, frequency of packet transmission, or in other manners.

At 610, the operation may limit a bandwidth of a dedicated bearer. As discussed above, the dedicated bearer, such as IF_1 122 of FIG. 1 or IF_1 220 of FIG. 2 may be a voice channel for VoLTE, and may not require an entire possible bandwidth for a communication device 200 to conduct a real time voice call with a QCI of 1 (e.g., highest quality). Accordingly, the bandwidth of the dedicated bearer may limited, restricted, or throttled from sending or receiving voice traffic in excess of the predetermined amount. As may be understood in the context of this disclosure, a bandwidth of one or more other bearers used in the MTN 106 may be limited as well.

At 612, the operation may include protecting a routing table in a trusted execution environment, such as the Trusted Execution Environment 222 of FIG. 2. For example, operation 612 may be performed for each communication device 200 connected to the MTN 106. In some embodiments, the routing table 216 may be included in the TEE 222 of the memory 206 by an original equipment manufacturer (OEM) during design and/or manufacturing. In other embodiments, the MTN 106 may update the routing table 216 of the communication device 200 to be located in and to be operated on in the TEE 222 portion of the communication device 200.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
 a communication device including a first memory coupled to a first processor, the first memory including one or more modules that are executable by the first processor to perform first operations comprising:
  gaining root access to the communication device;
  updating a routing table stored in the first memory of the communication device, the routing table identifying at least a first destination and a first communication bearer;
  encapsulating a hypertext transfer protocol (HTTP) request from an application stored in the first memory as an Internet Control Message Protocol (ICMP) packet; and
  transmitting the ICMP packet to a proxy server via the first communication bearer based at least in part on the routing table; and
 the proxy server including a second memory coupled to a second processor, the second memory including one or more modules that are executable by the second processor to perform second operations comprising:
  receiving the ICMP packet transmitted by the communication device;
  fetching content based at least in part on the HTTP request;
  encapsulating the content as an ICMP reply packet; and
  transmitting the ICMP reply packet to the communication device,
 wherein the updating the routing table stored in the first memory of the communication device includes adding the first destination to the routing table, the first destination indicating an address of the proxy server, and wherein the first communication bearer is a Voice over Long Term Evolution (VoLTE) voice channel having an associated Quality of Service (QoS) class identifier (QCI).

2. The system of claim 1, wherein the first operations of the communication device further comprise:

receiving the ICMP reply packet; and providing an indication to a service provider of a network vulnerability.

3. The system of claim 2, further comprising a data server associated with the service provider, the data server comprising a third memory coupled to a third processor, the third memory including one or more modules that are executable by the third processor to perform third operations comprising:

receiving the indication of the network vulnerability; and updating an access control list to block the ICMP packet from being delivered to the proxy server.

4. The system of claim 2, further comprising a data server associated with the service provider, the data server comprising a third memory coupled to a third processor, the third memory including one or more modules that are executable by the third processor to perform third operations comprising:

receiving the indication of the network vulnerability; and restricting a bandwidth of the first communication bearer.

5. A computer-implemented method comprising:

gaining root access to a communication device associated with a service provider;

updating a routing table of the communication device to identify at least a first destination and a first communication bearer, wherein the first destination is a destination unauthorized by the service provider;

encapsulating data as an encapsulated data packet;

transmitting the encapsulated data packet to a proxy server via the first communication bearer based at least in part on the routing table; and receiving an encapsulated reply data packet from the proxy server at the communication device, the encapsulated reply data packet including at least web content fetched by the proxy server, wherein the first communication bearer is a dedicated bearer providing Voice over Long Term Evolution (VoLTE) voice communications.

6. The method of claim 5, further comprising providing an indication to the service provider of a network vulnerability.

7. The method of claim 5, further comprising updating an access control list to block the encapsulated data packet from being delivered to the proxy server.

8. The method of claim 5, wherein the proxy server is not controlled by the service provider.

9. The method of claim 5, further comprising restricting a bandwidth of the first communication bearer.

10. The method of claim 5, wherein the encapsulating the data as the encapsulated data packet comprises encapsulating a hypertext transfer protocol (HTTP) request as an Internet Control Message Protocol (ICMP) packet.

11. The method of claim 5, further comprising:

providing an indication to the service provider of a network vulnerability; and in response, storing the routing table in a trusted execution environment of the communication device.

12. The method of claim 5, further comprising:

receiving the encapsulated data packet at the proxy server;

fetching content based at least in part on the encapsulated data packet;

encapsulating the content as an encapsulated reply packet; and transmitting the encapsulated reply packet to the communication device.

13. The method of claim 5, wherein the transmitting the encapsulated data packet is not logged in a data volume associated with a data monitoring module.

14. The method of claim 5, wherein the receiving the encapsulated reply data packet includes receiving the web content in an Internet Control Message Protocol (ICMP) reply packet from the proxy server.

15. A communication device operating on a network associated with a service provider, the communication device comprising:

a processor, and a memory including one or more modules that are executable by the processor to perform operations comprising:

updating a routing table stored in the memory to identify at least a first destination and a first communication bearer, wherein the first destination is a proxy server unauthorized by the service provider;

encapsulating data as an encapsulated data packet;

transmitting the encapsulated data packet to the proxy server via the first communication bearer based at least in part on the routing table;

receiving an encapsulated reply data packet, the encapsulated reply data packet including at least web content fetched by the proxy server;

providing an indication to the service provider of a network vulnerability; and in response, storing the routing table in a trusted execution environment of the communication device.

16. The communication device of claim 15, wherein the operations further comprise providing the indication to the service provider of the network vulnerability based at least in part on the receiving the encapsulated reply data packet.

17. The communication device of claim 15, wherein the encapsulating the data as the encapsulated data packet comprises encapsulating a hypertext transfer protocol (HTTP) request as an Internet Control Message Protocol (ICMP) packet.

* * * * *